(12) United States Patent
Kim et al.

(10) Patent No.: US 12,083,672 B2
(45) Date of Patent: Sep. 10, 2024

(54) GRAVITY COMPENSATION ASSEMBLY AND ROBOT WAIST STRUCTURE INCLUDING SAME

(71) Applicants: Korea University of Technology and Education Industry-University Cooperation Foundation, Cheonan-si (KR); NAVER LABS CORPORATION, Seongnam-si (KR)

(72) Inventors: Yong Jae Kim, Cheonan-si (KR); Seong Ho Yun, Goyang-si (KR)

(73) Assignees: Korea University Of Technology And Education Industry—University Corporation Foundation, Cheonan-si (KR); NAVER Corporation, Seongnam-si (KR)

( * ) Notice: Subject to any disclaimer, the term of this patent is extended or adjusted under 35 U.S.C. 154(b) by 159 days.

(21) Appl. No.: 17/404,396

(22) Filed: Aug. 17, 2021

(65) Prior Publication Data

US 2021/0370530 A1  Dec. 2, 2021

Related U.S. Application Data

(63) Continuation of application No. PCT/KR2020/002865, filed on Feb. 28, 2020.

(30) Foreign Application Priority Data

Feb. 28, 2019  (KR) .................. 10-2019-0024275
Feb. 28, 2019  (KR) .................. 10-2019-0024276

(51) Int. Cl.
*B25J 19/00* (2006.01)
*B25J 17/00* (2006.01)

(52) U.S. Cl.
CPC .......... *B25J 19/0016* (2013.01); *B25J 17/00* (2013.01); *B25J 19/002* (2013.01)

(58) Field of Classification Search
CPC ...... B25J 17/00; B25J 19/002; B25J 19/0016; F16M 2200/04
See application file for complete search history.

(56) References Cited

U.S. PATENT DOCUMENTS 4,592,697 A * 6/1986 Tuda .................... B25J 19/0016
                                                          267/71
5,402,690 A * 4/1995 Sekiguchi ............ B25J 19/0016
                                                          248/280.11

(Continued)

FOREIGN PATENT DOCUMENTS

JP  2011-240487 A  12/2011
JP  2018-075664 A  5/2018

(Continued)

OTHER PUBLICATIONS

European Search Report dated Nov. 15, 2022 issued in European Patent Application No. 20763452.8-1002.

(Continued)

*Primary Examiner* — William C Joyce
(74) *Attorney, Agent, or Firm* — Harness, Dickey & Pierce, P.L.C.

(57) ABSTRACT

A gravity compensation assembly including a main frame having one side connected to a weight body to be supported, and the other side where an inner rotation portion and an outer rotation portion spaced apart from each other and having rotation axis in an x-axis direction are coupled, an auxiliary frame having one side rotatably connected to the inner rotation portion of the main frame, and the other side where an auxiliary rotation portion having a rotation axis in the x-axis direction is coupled, and an elastic force providing having one side rotatably connected to the outer rotation (Continued)

portion of the main frame, and the other side coupled to the auxiliary rotation portion of the auxiliary frame, and configured to perform load compensation by an elastic force when a center of gravity changes as a relative angle of the main frame and the auxiliary frame changes may be provided.

19 Claims, 13 Drawing Sheets

(56) References Cited

U.S. PATENT DOCUMENTS

| | | | |
|---|---|---|---|
| 6,564,667 B2 * | 5/2003 | Bayer | B25J 19/0016 |
| | | | 901/48 |
| 7,836,584 B2 | 11/2010 | Lim | |
| 9,132,557 B2 | 9/2015 | Yamada et al. | |
| 10,471,610 B2 | 11/2019 | Han et al. | |
| 10,926,405 B2 | 2/2021 | Sugito et al. | |
| 2013/0061707 A1 | 3/2013 | Long | |
| 2018/0126548 A1 * | 5/2018 | Sugito | B25J 19/0016 |
| 2019/0112166 A1 | 4/2019 | Schinkel et al. | |

FOREIGN PATENT DOCUMENTS

| | | | |
|---|---|---|---|
| KR | 10-0837928 B1 | | 6/2008 |
| KR | 10-2016-0148227 A | | 12/2016 |
| NL | 1009883 | * | 2/2000 |
| WO | WO-2017/167962 A1 | | 10/2017 |

OTHER PUBLICATIONS

Internation Search Report dated Jun. 11, 2020 in International Application No. PCT/KR2020/002865.

Written Opinion dated Feb. 28, 2020 issued in International Application No. PCT/KR2020/002865.

* cited by examiner

GRAVITY COMPENSATION ASSEMBLY AND ROBOT WAIST STRUCTURE INCLUDING SAME

CROSS-REFERENCE TO RELATED APPLICATIONS

This U.S. non-provisional application is a continuation of and claims the benefit of priority under 35 U.S.C. § 365 (c) to International Application No. PCT/KR2020/002865, which has an International filing date of Feb. 28, 2020 and claims priority Korean Patent Application Nos. 10-2019-0024275, filed on Feb. 28, 2019, and 10-2019-0024276, filed on Feb. 28, 2019, the entire contents of each of which are incorporated by reference.

TECHNICAL FIELD

The present disclosure relates to gravity compensation assemblies and/or waist structures of a robot including the same, and more particularly, to gravity compensation assemblies capable of performing gravity compensation by an elastic force providing assembly, and/or waist structures of a robot including the gravity compensation assembly.

BACKGROUND

Since Unimate, which is the first industrial robot, was used for automobile assembly in 1962, robotics has become an essential technology in the fields of production, service, medical treatment, exploration, military, and aerospace, owing to the rapid technology development and the spread of application fields.

Purposes of conventional robots were to precisely perform simple repetitive operations at a high speed, but recently, various types and various levels of robots have been developed, such as robots for sharing activity spaces with humans via remote connection, surgery robots for facilitating various types of surgery, such as laparoscopic surgery, and industrial robots enabling safe physical contacts with humans.

In particular, recently, there is also a focus on the development of humanoid robots very similar to humans, and accordingly, there have been efforts to mechanically reproduce body structures including joints of the humans.

Such humanoid robots essentially require a gravity compensation structure for compensating for a shift in the center of gravity according to movement of an upper body, in a waist structure connecting the upper body and a lower body.

However, a gravity compensation structure currently applied to a waist structure of a robot has a complicated mechanism, and thus but it is not only difficult to implement the gravity compensation structure, but also difficult to secure multi-degree of freedom, manufacturing costs are high, and it is difficult to quickly deal with a malfunction.

Accordingly, a method for resolving such problems is required.

The present disclosure has been devised to solve the problems of the related art, and the present disclosure provides gravity compensation structures having a high degree of freedom and relatively simple structures.

Also, the present disclosure provides methods of applying such gravity compensation structures to waist structures of a robot to reproduce the waist movement of a human with improved precision.

The problems of the present disclosure are not limited to those mentioned above, and other problems that are not mentioned may be clearly understood by one of ordinary skill in the art from the following description.

SUMMARY

According to an example embodiment of the present disclosure, a gravity compensation assembly includes a main frame assembly having one side connected to a weight body that is to be supported, and the other side where an inner rotation portion and an outer rotation portion spaced apart from each other and having rotation axes in an x-axis direction are coupled, an auxiliary frame assembly having one side rotatably connected to the inner rotation portion of the main frame assembly, and the other side where an auxiliary rotation portion having a rotation axis in the x-axis direction is coupled, and an elastic force providing assembly having one side rotatably connected to the outer rotation portion of the main frame assembly, and the other side coupled to the auxiliary rotation portion of the auxiliary frame assembly, the elastic force providing assembly configured to perform load compensation by an elastic force when a center of gravity changes as a relative angle of the main frame assembly and the auxiliary frame assembly changes.

The auxiliary frame assembly may include a fixed frame and a roll rotation portion connected to the inner rotation portion and configured to rotate based on a rotation axis in a y-axis direction from one side of the fixed frame.

The auxiliary rotation portion may be configured to rotate based on the rotation axis in the y-axis direction from the other side of the fixed frame.

The main frame assembly may include an auxiliary roll rotation portion configured to rotate the outer rotation portion based on the rotation axis in the y-axis direction, and the auxiliary roll rotation portion may be configured to rotate in connection with rotation of the roll rotation portion and rotation of the auxiliary rotation portion.

The elastic force providing assembly may include a center bar having one side rotatably connected to the outer rotation portion of the main frame assembly, and elongated in a length direction, a fixing member provided on the other side of the center bar, and an elastic member having one side coupled to the auxiliary rotation portion and the other side coupled to the fixing member, the elastic member configured to perform load compensation by an elastic force by being compressed with movement of the center bar according to movement of the main frame assembly.

The elastic force providing assembly may further include an elastic force adjusting part configured to adjust an elastic force of the elastic member by changing a distance between the fixing member and the elastic member.

The main frame assembly may include a center of gravity changing part configured to change the center of gravity by adjusting a horizontal position of the outer rotation portion.

The main frame assembly may include a distance changing part configured to change a distance between the inner rotation portion and the outer rotation portion.

The main frame assembly may be configured to be rotatably connected to the weight body based on the rotation axis in the x-axis direction.

The gravity compensation assembly may further include a link assembly spaced apart from and in parallel with the main frame assembly, the link assembly comprising a link frame having one side where a first link rotation portion rotatably connected to the weight body based on the rotation axis in the x-axis direction is coupled, and the other side where a second link rotation portion rotatably connected to the auxiliary frame assembly based on the rotation axis in the x-axis direction is coupled, the link assembly coupled to perform compensation such that, when the center of gravity of the weight body is changed, a constant center of gravity is achieved according to rotation of the first link rotation portion and second link rotation portion.

The gravity compensation assembly further includes a pair of link frames including the link frame and spaced apart from each other in a left-and-right direction.

Each of the pair of link frames may be curved inward.

The gravity compensation assembly further includes a third link rotation portion rotatably connected to the weight body based on a rotation axis in a y-axis direction and being on the one side of the link frame, and a fourth link rotation portion rotatably connected to the auxiliary frame assembly based on the rotation axis in the y-axis direction and being on the other side of the link frame.

The auxiliary frame assembly may include a fixed frame to which the second link rotation portion of the link frame is rotatably connected and a roll rotation portion connected to the inner rotation portion and configured to rotate based on a rotation axis in a y-axis direction from one side of the fixed frame.

The auxiliary rotation portion may be configured rotate based on the rotation axis in the y-axis direction from the other side of the fixed frame.

The main frame assembly may include an auxiliary roll rotation portion configured to rotate the outer rotation portion based on the rotation axis in the y-axis direction, and the auxiliary roll rotation portion may be configured to rotate in connection with rotation of the roll rotation portion and rotation of the auxiliary rotation portion.

The inner rotation portion and the auxiliary rotation portion each may include a universal joint, and the outer rotation portion may include a ball joint.

The main frame assembly may include a main frame that is a center support structure.

The main frame assembly may further include an auxiliary roll rotation portion configured to rotate the outer rotation portion based on a rotation axis in a y-axis direction, and a connecting portion connecting the main frame and the auxiliary roll rotation portion to each other.

According to another example embodiment of the present disclosure, a waist structure of a robot includes the aforementioned gravity compensation assembly.

A gravity compensation assembly and a waist structure of a robot including the same of the present disclosure for resolving the above problems may have following effects.

First, full gravity compensation can be performed even when the center of gravity of a weight body connected to an upper portion shifts.

Second, a degree of freedom is high because not only pitch rotation, but also roll rotation of a joint can be implemented, and thus an operation similar to waist movement of a human can be performed with improved precision.

Third, a structure is relatively simple and can be relatively easily implemented, and thus a quicker response may be possible even during a malfunction.

The effects of the present disclosure are not limited to those mentioned above, and other effects that are not mentioned may be clearly understood by one of ordinary skill in the art from the scope of claims.

DETAILED DESCRIPTION

Figure 1:
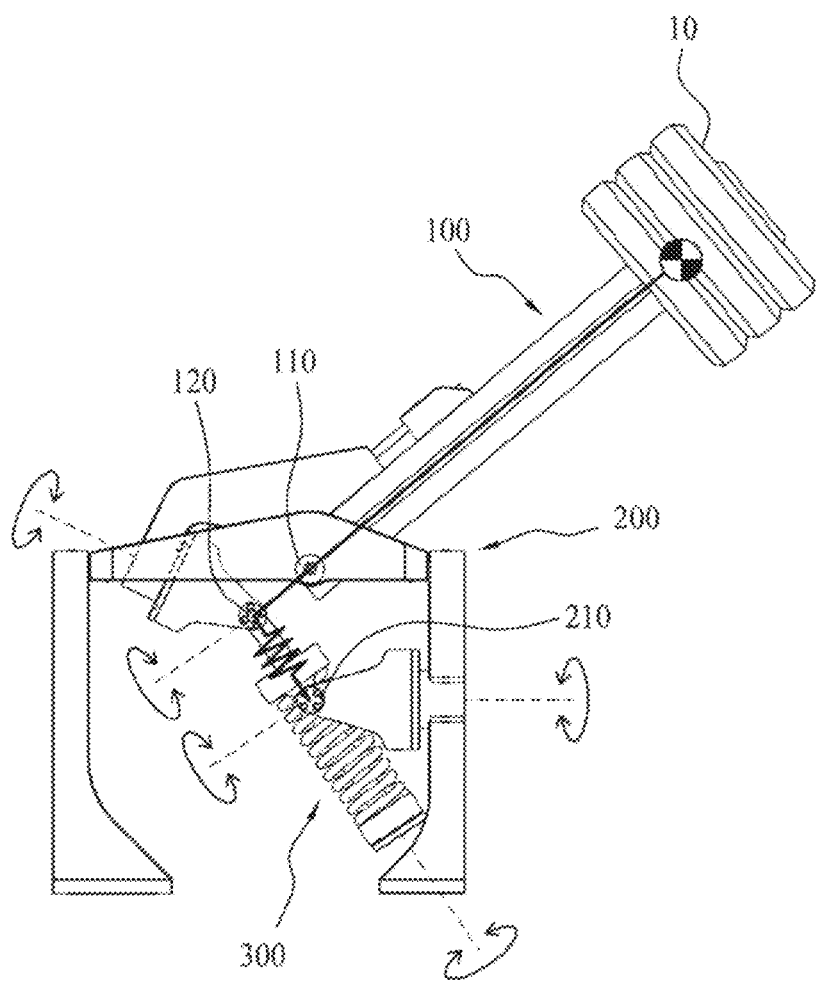
FIG. 1 is a diagram of a structure of a gravity compensation assembly, according to an example embodiment of the present disclosure.

Hereinafter, some embodiments of the present disclosure will be described with reference to the accompanying drawings. While describing some example embodiments, like names and like reference numerals are used for like elements, and the additional description thereof will be omitted.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

FIG. 1 is a diagram showing a structure of a gravity compensation assembly according to an example embodiment of the present disclosure, and FIGS. 2 through 5 are diagrams schematically showing a principle of the gravity compensation assembly, according to an example embodiment of the present disclosure.

As shown in FIGS. 1 through 5, the gravity compensation assembly according to the present disclosure largely includes a main frame assembly 100, an auxiliary frame assembly 200, and an elastic force providing assembly 300.

In the main frame assembly 100, one side is connected to a weight body 10 to be supported, and an inner rotation portion 110 and an outer rotation portion 120 spaced apart from each other and having rotation axes in an x-axis direction are provided on the other side.

Also, the auxiliary frame assembly 200 has a form in which one side is rotatably connected to the inner rotation portion 110 of the main frame assembly 100, and an auxiliary rotation portion 210 having a rotation axis in the x-axis direction is formed or provided on the other side. In FIG. 1, the auxiliary frame assembly 200 is realized in a form in which a plurality of components are connected to each other, but may be shown in a schematic form as shown in FIGS. 2 through 5.

In the elastic force providing assembly 300, one side is rotatably connected to the outer rotation portion 120 of the main frame assembly 100, and the other side is coupled or fixed to the auxiliary rotation portion 210 of the auxiliary frame assembly 200. The elastic force providing assembly 300 has one side rotatably connected to the outer rotation portion 120 of the main frame assembly 100 based on the x-axis direction and the other side fixed to the auxiliary rotation portion 210 of the auxiliary frame assembly 200, and performs load compensation by an elastic force when the center of gravity changes as a relative angle between the main frame assembly 100 and the auxiliary frame assembly 200 changes.

Figure 2:
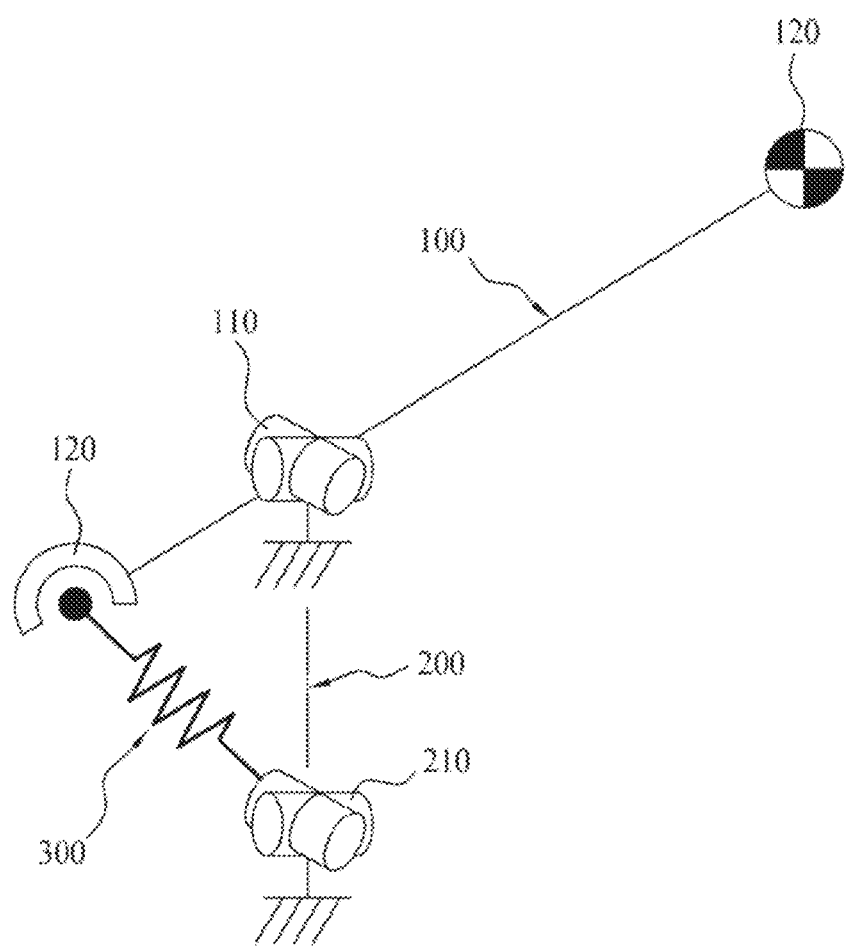
FIGS. 2 through 5 are diagrams schematically showing a principle of the gravity compensation assembly, according to an example embodiment of the present disclosure.

In other words, the gravity compensation assembly according to the present disclosure has a form in which a pair of any one of the inner rotation portion 110, the outer rotation portion 120, and the auxiliary rotation portion 210 are connected to each other as shown in FIGS. 1 and 2, and the main frame assembly 100 extends further upward than the inner rotation portion 110 to support the weight body 10.

In such a gravity compensation assembly, a universal joint type is applied to the inner rotation portion 110 and the auxiliary rotation portion 210, and a ball joint type for realizing two-degree-of-freedom described below is applied to the outer rotation portion 120, but it is obvious that the two-degree-of-freedom to be realized in the present disclosure may be configured even when the universal joint type is applied to the inner rotation portion 110 and the outer rotation portion 120, and the ball joint type is applied to the auxiliary rotation portion 210. In other words, the inner rotation portion 110 and the auxiliary rotation portion 210 each include a universal joint, and the outer rotation portion 120 includes a ball joint, FIGS. 3 and 4 schematically shows such a gravity compensation assembly being applied to a waist joint of a robot, wherein the weight body 10 being supported is an upper body structure of the robot.

Figure 3:
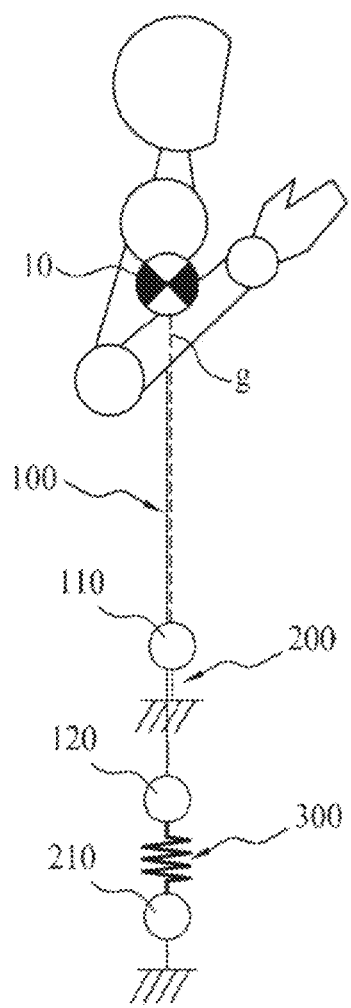

In other words, while the waist joint of the robot is erected as shown in FIG. 3, the inner rotation portion 110, the outer rotation portion 120, and the auxiliary rotation portion 210 are balanced by being positioned on a straight line with the center of gravity g.

Figure 4:
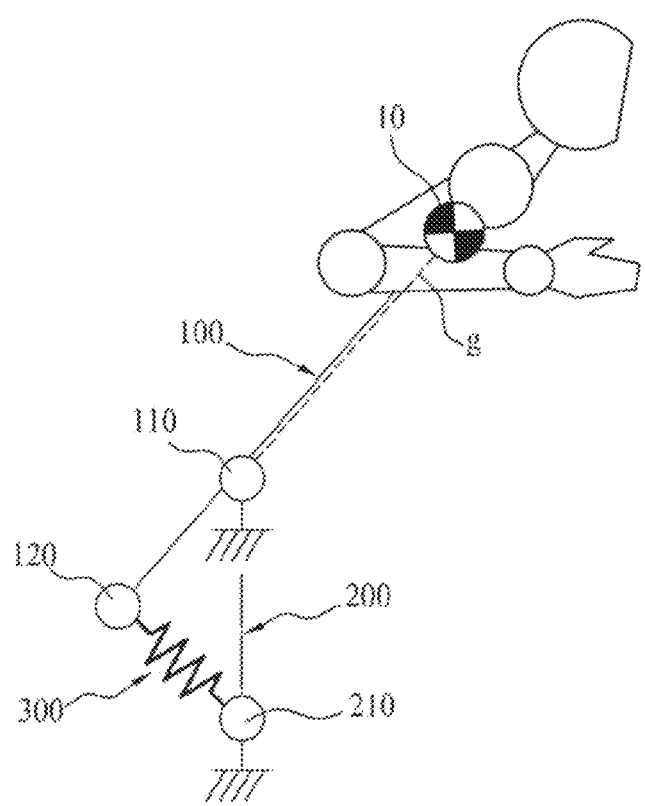

However, as shown in FIG. 4, when the waist joint of the robot is pitch-rotated, the main frame assembly 100 is tilted and thus the center of gravity g of the weight body 10 is changed, and accordingly, the main frame assembly 100, the auxiliary frame assembly 200, and the elastic force providing assembly 300 are relatively rotated to form a triangular shape, based on the inner rotation portion 110, the outer rotation portion 120, and the auxiliary rotation portion 210.

At this time, the elastic force providing assembly 300 is elastically deformed, and the changed center of gravity g of the weight body 10 is compensated for by a consequent restoring force, thereby achieving balance. Also, when a pitch rotation angle is increased or decreased, the deformation of the elastic force providing assembly 300 is also changed proportionally, and thus the center of gravity g of the weight body 10 may be compensated for in a similar manner to achieve balance.

In addition, in the gravity compensation assembly according to the present disclosure, the auxiliary frame assembly 200 may further include a roll rotation portion configured to rotate based on a rotation axis in a y-axis direction, and the auxiliary rotation portion 210 may also be configured to rotate based on a rotation axis in the y-axis direction, such that the weight body 10 is not only to pitch-rotated, but also roll-rotated.

As such, even when the weight body 10 is roll-rotated, the elastic force providing assembly 300 is elastically deformed, and thus the center of gravity g of the weight body 10 may be compensated for. This will be described in detail below.

Figure 5:
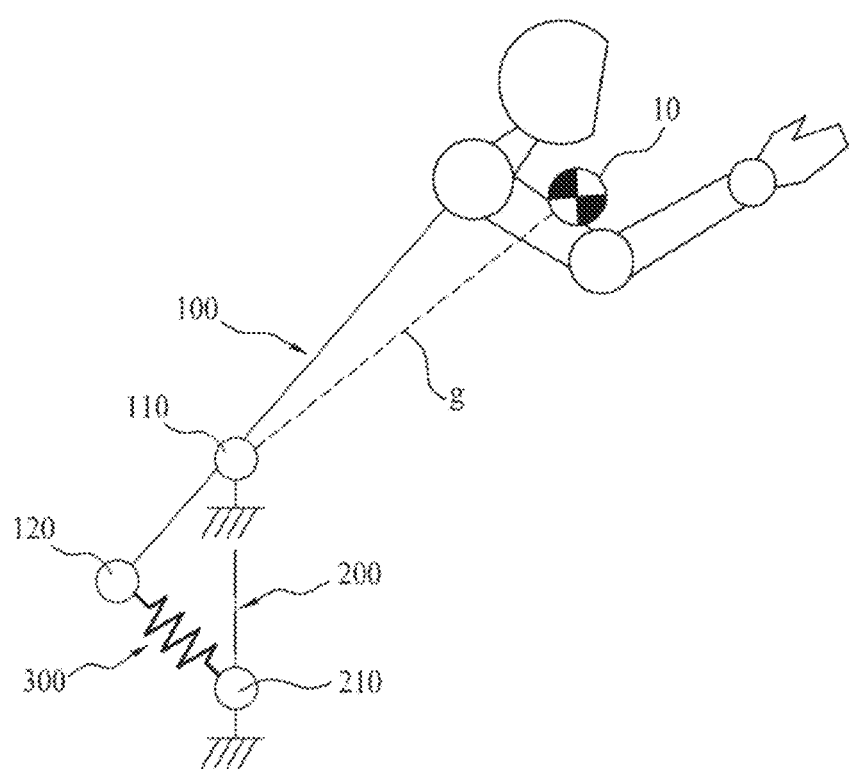

Meanwhile, when the gravity compensation assembly is shown to be applied to the waist joint of the robot as shown in FIG. 5, the center of gravity g of the upper body structure of the robot (e.g., the weight body 10) may change according to movement of an arm or the like.

Accordingly, the gravity compensation assembly of the present disclosure may further include a structure for compensating for the change in the center of gravity g according to the movement of the weight body 10.

Figure 6:
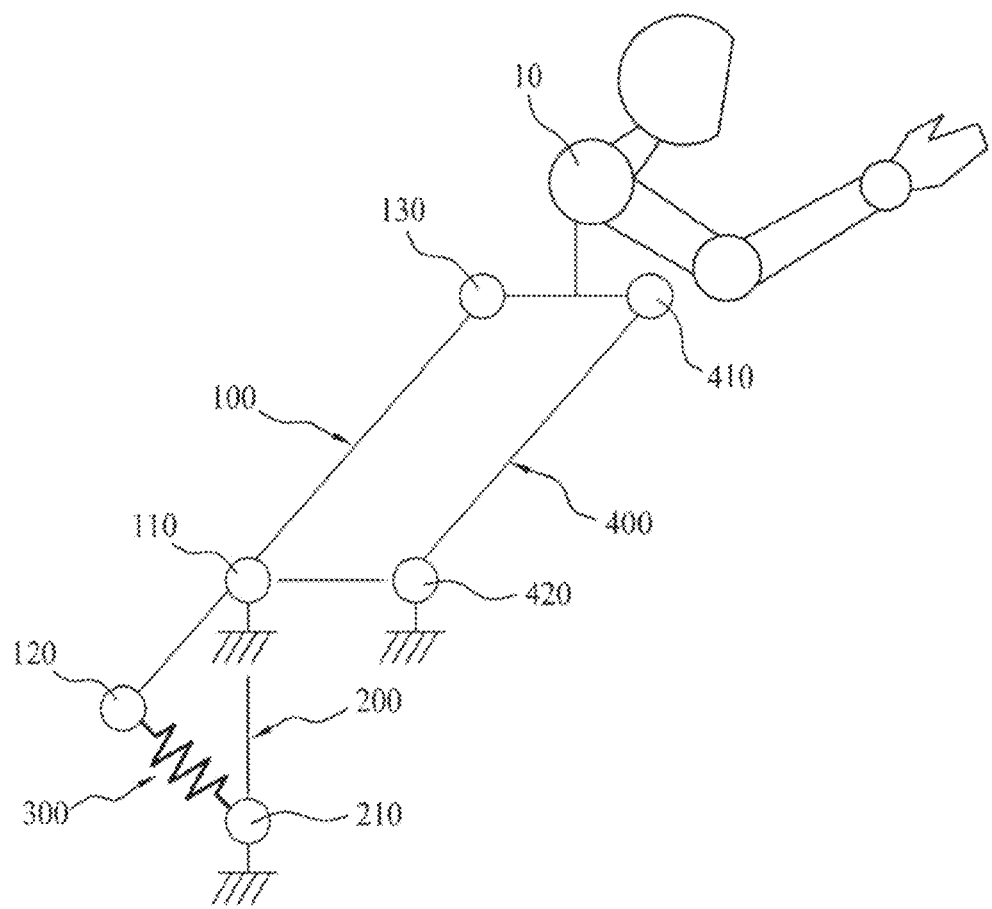
FIG. 6 is a diagram of a structure for compensating for a shift of the center of gravity, in the gravity compensation assembly according to an example embodiment of the present disclosure.

FIG. 6 is a diagram of a structure for compensating for a shift of the center of gravity, in the gravity compensation assembly according to an example embodiment of the present disclosure.

As shown in FIG. 6, the gravity compensation assembly according to an example embodiments may further include a link assembly 400 spaced apart from and in parallel with the main frame assembly 100, and having one side where a first link rotation portion 410 rotatably connected to the weight body 10 based on a rotation axis in the x-axis direction is formed (e.g., provided, coupled, or attached) and the other side where a second link rotation portion 420 rotatably connected based on a rotation axis in the x-axis direction is formed (e.g., provided, coupled, or attached), to perform compensation such that, when the center of gravity of the weight body 10 is changed, the constant center of gravity is achieved according to rotation of the first link rotation portion 410 and second link rotation portion 420.

Here, the main frame assembly 100 further includes an auxiliary link rotation portion 130 rotatably connected to the weight body 10 based on a rotation axis in the x-axis direction.

In other words, the link assembly 400 supports the weight body 10 together with the main frame assembly 100, and the first link rotation portion 410 and second link rotation portion 420 form vertices of a parallelogram together with the inner rotation portion 110 and auxiliary link rotation portion 130, thereby performing compensation for a change in the center of gravity of the weight body 10 caused by various reasons.

Hereinafter, an example embodiment of the present disclosure, in which the above-described gravity compensation assembly is actually implemented as a waist structure of the robot, will be described in detail.

Figure 7:
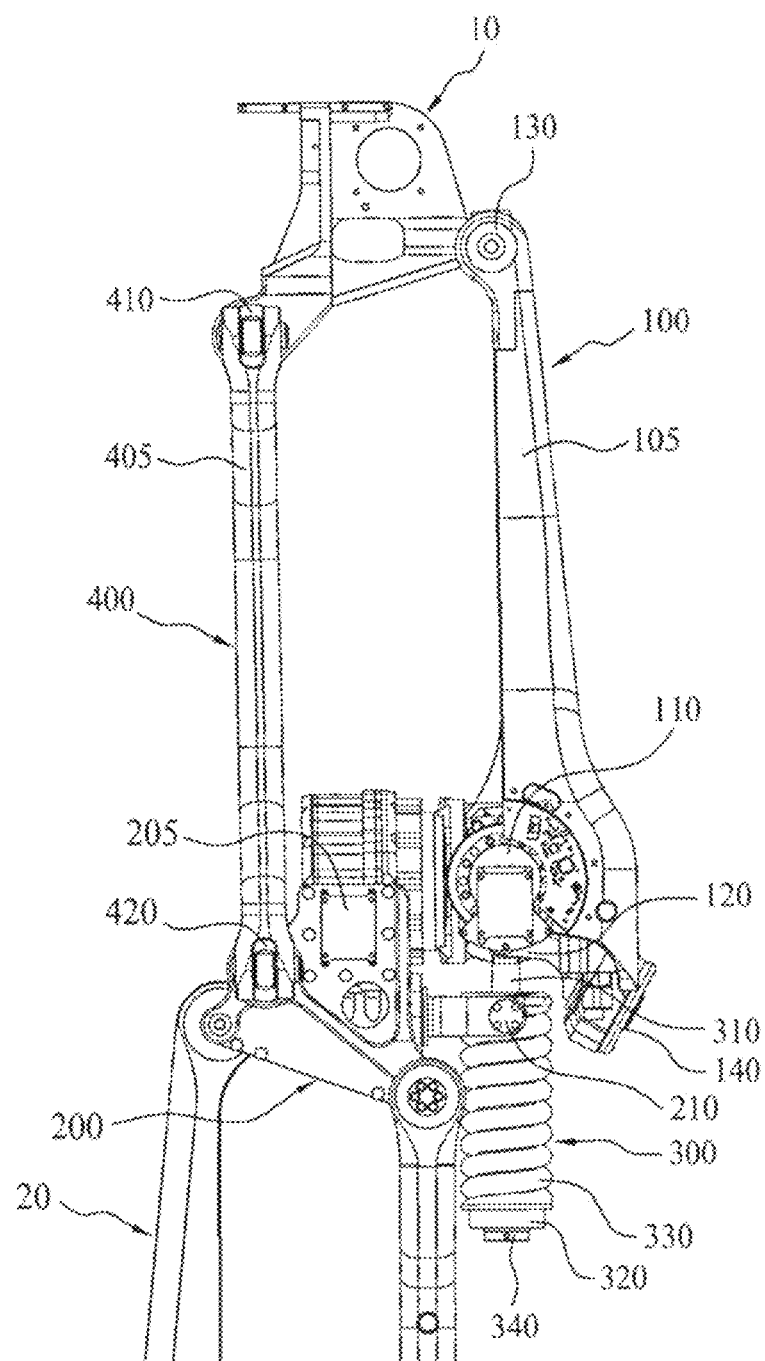
FIGS. 7 and 8 are diagrams of a structure of a waist structure of a robot, according to an example embodiment of the present disclosure.
Figure 8:
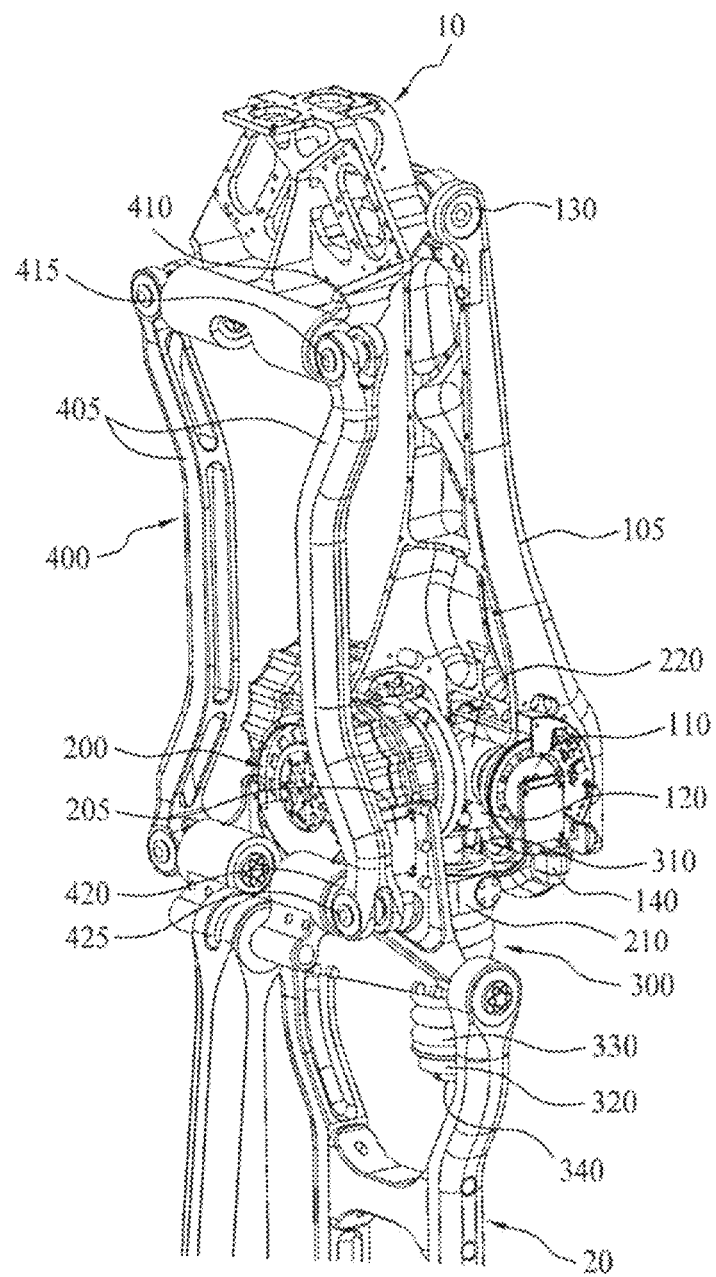

FIGS. 7 and 8 are diagrams of a structure of the waist structure of the robot, according to an example embodiment of the present disclosure.

As shown in FIGS. 7 and 8, the gravity compensation assembly applied as the waist structure of the robot is positioned between the weight body 10 that is the upper body structure of the robot positioned at an upper portion, and a base 20 that is a lower body structure of robot positioned at a lower portion.

The waist structure of the robot includes the main frame assembly 100, the auxiliary frame assembly 200, the elastic force providing assembly 300, and the link assembly 400 as described above.

In the current example embodiment, the main frame assembly 100 includes a main frame 105 that is a center support structure, and the inner rotation portion 110 and the outer rotation portion 120 that are spaced apart from each other at the main frame 105.

Also, the auxiliary frame assembly 200 includes a fixed frame 205, a roll rotation portion 220 connected to the inner rotation portion 110 of the main frame assembly 100 and configured to rotate based on a rotation axis in the y-axis direction from one side of the fixed frame 205, and the auxiliary rotation portion 210 configured to rotate based on a rotation axis in the y-axis direction from the other side of the fixed frame 205 and having a rotation axis in the x-axis direction with respect to the elastic force providing assembly 300.

Also, in the current example embodiment, the main frame assembly 100 may further include an auxiliary roll rotation portion 140 connected to the main frame 105 such that the outer rotation portion 120 rotates based on a rotation axis in the y-axis direction. In other words, the auxiliary roll rotation portion may be configured to rotate the outer rotation portion 120 based on a rotation axis in the y-axis direction. Accordingly, the auxiliary roll rotation portion 140 is formed or configured to rotate in connection with rotation of the roll rotation portion 220 and rotation of the auxiliary rotation portion 210.

Figure 9:
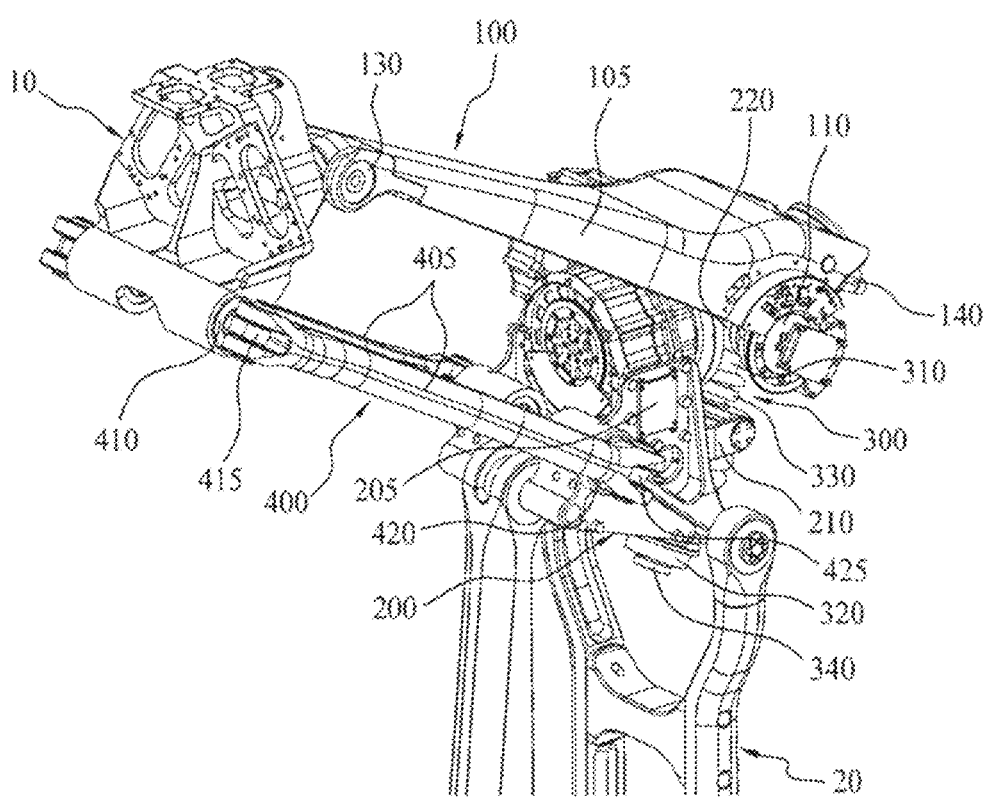
FIG. 9 is a diagram showing pitch rotation of the waist structure of the robot, according to an example embodiment of the present disclosure.

In other words, the main frame assembly 100 may perform pitch rotation as shown in FIG. 9, according to rotation of the inner rotation portion 110 and outer rotation portion 120 based on the rotation axis in the x-axis direction, and rotation of the auxiliary rotation portion 210 based on the rotation axis in the x-axis direction.

Figure 10:
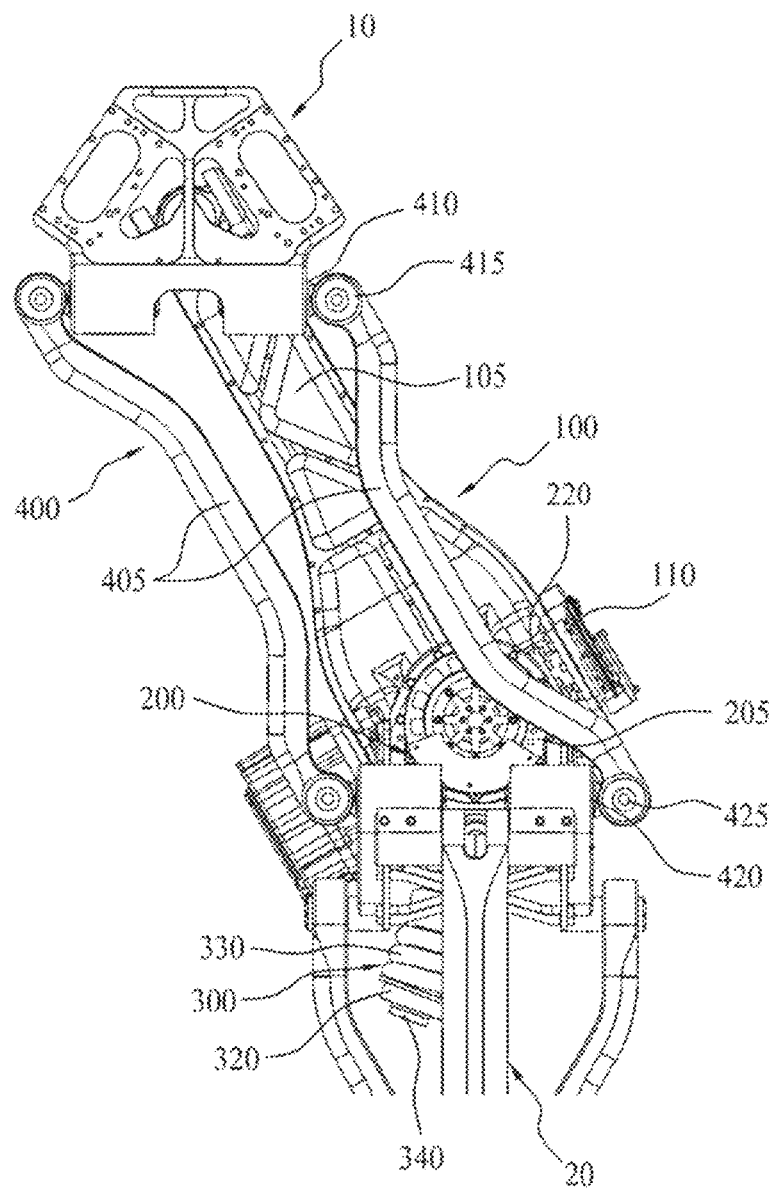
FIGS. 10 and 11 are diagrams showing roll rotation of the waist structure of the robot, according to an example embodiment of the present disclosure.
Figure 11:
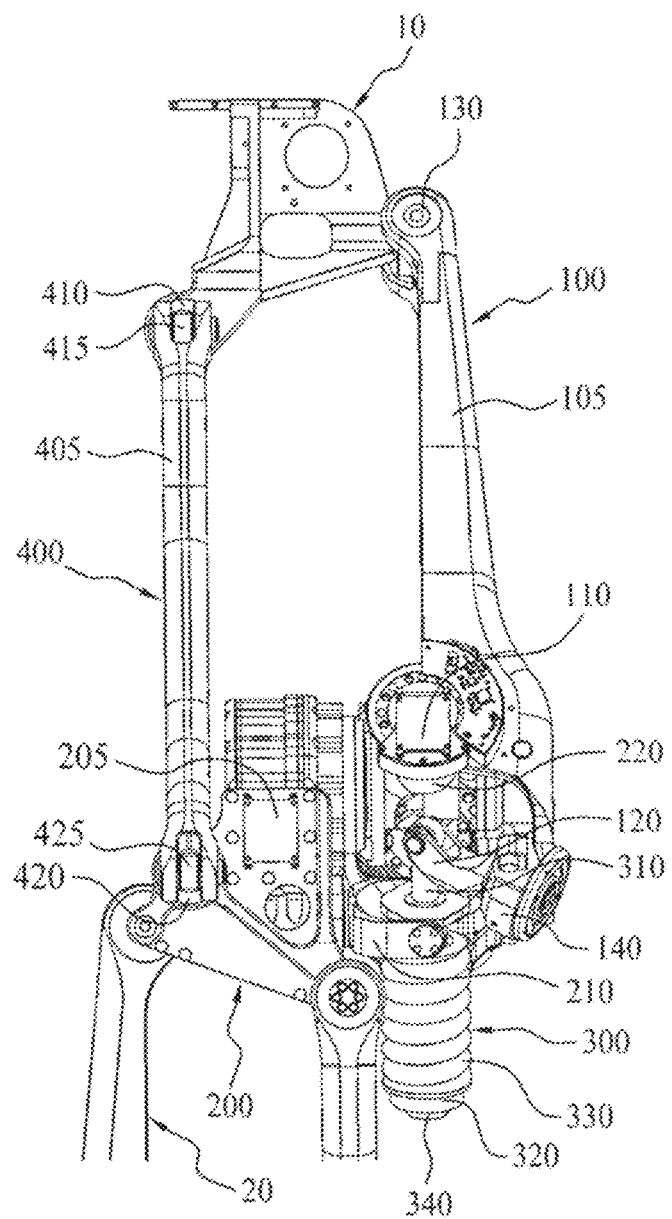

Further, the main frame assembly 100 may perform roll rotation as shown in FIGS. 10 and 11, according to rotation of the auxiliary rotation portion 210 and rotation of the roll rotation portion 220 based on the rotation axis in the y-axis direction, and associated rotation of the auxiliary roll rotation portion 140 based on the rotation axis in the y-axis direction.

As such, because the gravity compensation assembly of the present disclosure is able to compensate for shift of the center of gravity while having a multi-degree of freedom, the gravity compensation assembly may realize movement to the waist of a human with improved precision.

According to the current example embodiment, the elastic force providing assembly 300 includes a center bar 310 having one side rotatably connected to the outer rotation portion 120 of the main frame assembly 100, and elongated in a length direction, a fixing member 320 provided on the other side of the center bar 310, and an elastic member 330 having one side rotatably fixed by or rotatably coupled to the auxiliary rotation portion 210 based on a rotation axis in the x-axis direction and the other side fixed by or coupled to the fixing member 320 to perform load compensation by an elastic force by being compressed with movement of the center bar 310 according to movement of the main frame assembly 100.

In other words, the center bar 310 linearly moves during the pitch rotation shown in FIG. 9 and the roll rotation shown in FIGS. 10 and 11, and accordingly, a distance between the fixing member 320 and the auxiliary rotation portion 210 is drawn near, and thus the elastic member 330 may perform the load compensation by being compressed.

According to the current example embodiment, the link assembly 400 includes a pair of link frames 405 spaced apart from each other in a left-and-right direction.

The link frame 405 is spaced apart from and in parallel with the main frame 105 of the main frame assembly 100, and has one side where the first link rotation portion 410 rotatably connected to the weight body 10 based on the rotation axis in the x-axis direction is formed (e.g., provided, coupled, or attached) and the other side where the second link rotation portion 420 rotatably connected to the auxiliary frame assembly 200 based on the rotation axis in the x-axis direction is formed (e.g., provided, coupled, or attached).

For example, the second link rotation portion of the link frame 420 may be rotatably connected to the fixed frame 205.

Accordingly, when the center of gravity of the weight body 10 is changed according to movement of an arm of the like, the first link rotation portion 410 and second link rotation portion 420 rotate together with the auxiliary link rotation portion 130 and the inner rotation portion 110 of the main frame 105 such that the weight body 10 maintains balance, and even when the center of gravity of the weight body 10 is changed. Thus, full gravity compensation may be possible.

According to the current example embodiment, a third link rotation portion 415 rotatably connected to the weight body 10 based on a rotation axis in the y-axis direction is further formed (e.g., provided, coupled, or attached) at one side of the link frame 405, and a fourth link rotation portion 425 rotatably connected to the auxiliary frame assembly 200 based on a rotation axis in the y-axis direction may be further formed (e.g., provided, coupled, or attached) at the other side of the link frame 405.

The third link rotation portion 415 and the fourth link rotation portion 425 may enable the weight body 10 to maintain the balance even during the roll rotation by rotating the link frame 405 in response to the roll rotation of the main frame 105.

In the current example embodiment, the pair of link frames 405 are formed (e.g., provided) such that a distance therebetween is drawn near as the one side and the other side are curved inward, to reduce interference with various instruments that may be added to the weight body 10. In other words, each of the pair of link frames 405 is curved inward.

As described above, in the current example embodiment, the full gravity compensation may be performed even during the shift of the center of gravity of the weight body 10 connected to the upper portion, and because not only the pitch rotation, but also the roll rotation of the waist joint are realized, the waist structure of the robot has a relatively high degree of freedom, and thus an operation similar to waist movement of a human may be performed with improved precision.

Figure 12:
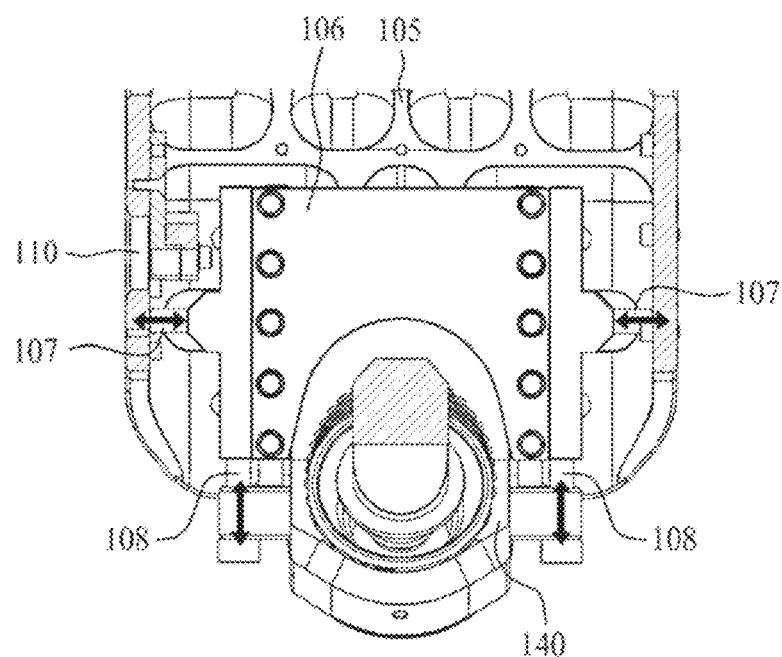
FIG. 12 is a diagram showing a variable structure of the center of gravity and a distance variable structure between rotation axes, in the waist structure of the robot, according to an example embodiment of the present disclosure.

FIG. 12 is a diagram showing a variable structure of the center of gravity and a distance variable structure between rotation axes, in the waist structure of the robot, according to an example embodiment of the present disclosure.

As shown in FIG. 12, the main frame assembly 100 according to the current example embodiment may further include a center of gravity changing part 107 and a distance changing part 108.

For example, in the current example embodiment, the main frame assembly 100 includes a connecting portion 106 connecting the main frame 105 and the auxiliary roll rotation portion 140 to each other, and the connecting portion 106 and the main frame 105 are connected to each other by the center of gravity changing part 107.

The center of gravity changing part 107 adjusts a horizontal position of the connecting portion 106 according to a screw adjustment method. When the horizontal position of the connecting portion 106 is adjusted, a horizontal position of the outer rotation portion 120 connected to the auxiliary roll rotation portion 140 is also adjusted, and thus the center of gravity of the entire structure may be changed.

Such a center of gravity changing part 107 may compensate for the center of gravity of the entire structure when the center of gravity is misaligned from a desired state.

In the current example embodiment, the connecting portion 106 and the auxiliary roll rotation portion 140 are connected by the distance changing part 108.

The distance changing part 108 adjusts a vertical position of the connecting portion 106 according to a screw adjustment method. When the vertical position of the connecting portion 106 is adjusted, a vertical position of the outer rotation portion 120 connected to the auxiliary roll rotation portion 140 is also adjusted, and thus the distance between the inner rotation portion 110 and the outer rotation portion 120 may be changed.

Such a distance changing part 108 may adjust weight balance by changing the distance between the inner rotation portion 110 and the outer rotation portion 120 according to factors, such as a weight of the weight body 10, a distance between the weight body 10 and the outer rotation portion 120, and the like.

Figure 13:
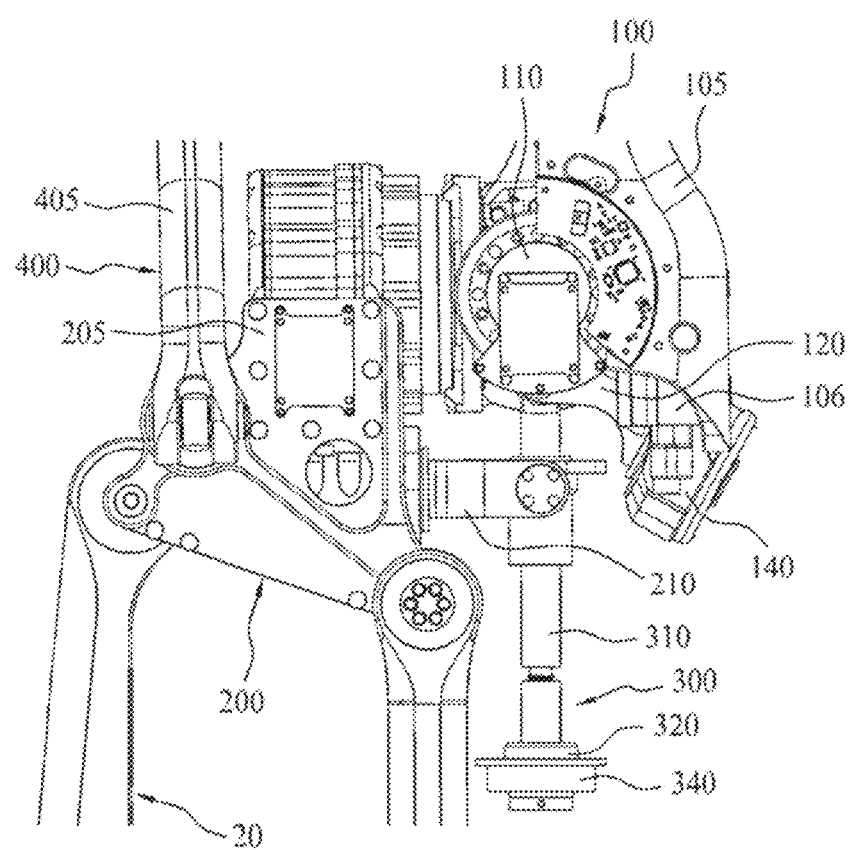
FIG. 13 is a diagram showing an elastic variable structure of an elastic force providing assembly in the waist structure of the robot, according to an example embodiment of the present disclosure.

FIG. 13 is a diagram showing an elastic variable structure of the elastic force providing assembly 300 in the waist structure of the robot, according to an example embodiment of the present disclosure.

As shown in FIG. 13, the elastic force providing assembly 300 according to the current example embodiment may further include an elastic force adjusting part 340.

The elastic force adjusting part 340 may change a distance between the fixing member 320 and the elastic member 330 according to a screw adjustment method. For example, the elastic force adjusting part 340 may change a distance between the fixing member 320 and the auxiliary rotation portion 210 according to a screw adjustment method. This is to adjust a degree of compression of the elastic member 330 to adjust the elastic force of the elastic member 330.

In other words, according to the current example embodiment, in addition to a weight balance adjusting function of the distance changing part 108 described above, the weight balance may be adjusted by adjusting the elastic force of the elastic member 330 according to the factors, such as the weight of the weight body 10, the distance between the weight body 10 and the outer rotation portion 120, and the like.

Hereinabove, some example embodiments according to the present disclosure have been described, and it would be obvious to one of ordinary skill in the art that the present disclosure may be embodied in other specific forms, in addition to the above-described example embodiments, without departing from the intent or scope of the present disclosure. Therefore, the above-described example embodiments should be considered as examples. Accordingly, the present disclosure is not limited to the above-described example embodiments and may be changed within the scope of the appended claims and within the equivalent range of the appended claims.

What is claimed is:

1. A gravity compensation assembly comprising:
    a main frame assembly having one side connected to a weight body that is to be supported, and the other side where an inner rotation portion and an outer rotation portion spaced apart from each other and having rotation axes in an x-axis direction are coupled;
    an auxiliary frame assembly having one side rotatably connected to the inner rotation portion of the main frame assembly, and the other side where an auxiliary rotation portion having a rotation axis in the x-axis direction is coupled; and
    an elastic force providing assembly having one side rotatably connected to the outer rotation portion of the main frame assembly, and the other side coupled to the auxiliary rotation portion of the auxiliary frame assembly, the elastic force providing assembly configured to perform load compensation by an elastic force when a center of gravity changes as a relative angle of the main frame assembly and the auxiliary frame assembly changes,
    wherein the outer rotation portion is at an end of the other side of the main frame assembly, and the inner rotation portion is between the one side and the other side of the main frame assembly, and
    wherein the auxiliary frame assembly comprises,
        a fixed frame, and
        a roll rotation portion connected to the inner rotation portion, the roll rotation portion configured to rotate based on a rotation axis in a y-axis direction from one side of the fixed frame.

2. The gravity compensation assembly of claim 1, wherein the auxiliary rotation portion is configured to rotate based on the rotation axis in the y-axis direction from the other side of the fixed frame.

3. The gravity compensation assembly of claim 2, wherein
    the main frame assembly comprises an auxiliary roll rotation portion configured to rotate the outer rotation portion based on the rotation axis in the y-axis direction, and
    the auxiliary roll rotation portion is configured to rotate in connection with rotation of the roll rotation portion and rotation of the auxiliary rotation portion.

4. The gravity compensation assembly of claim 1, wherein the elastic force providing assembly comprises:
    a center bar having one side rotatably connected to the outer rotation portion of the main frame assembly, and elongated in a length direction;
    a fixing member provided on the other side of the center bar; and
    an elastic member having one side coupled to the auxiliary rotation portion and the other side coupled to the fixing member, the elastic member configured to perform load compensation by an elastic force by being compressed with movement of the center bar according to movement of the main frame assembly.

5. The gravity compensation assembly of claim 4, wherein the elastic force providing assembly further comprises an elastic force adjusting part configured to adjust an elastic force of the elastic member by changing a distance between the fixing member and the elastic member.

6. The gravity compensation assembly of claim 1, wherein the main frame assembly comprises a center of gravity changing part configured to change the center of gravity by adjusting a horizontal position of the outer rotation portion.

7. The gravity compensation assembly of claim 1, wherein the main frame assembly comprises a distance changing part configured to change a distance between the inner rotation portion and the outer rotation portion.

8. The gravity compensation assembly of claim 1, wherein the main frame assembly is configured to be rotatably connected to the weight body based on the rotation axis in the x-axis direction.

9. The gravity compensation assembly of claim 8, further comprising:
    a link assembly spaced apart from and in parallel with the main frame assembly, the link assembly comprising a link frame having one side where a first link rotation portion rotatably connected to the weight body based on the rotation axis in the x-axis direction is coupled, and the other side where a second link rotation portion rotatably connected to the auxiliary frame assembly based on the rotation axis in the x-axis direction is coupled, the link assembly configured to perform compensation such that, when the center of gravity of the weight body is changed, a constant center of gravity is achieved according to rotation of the first link rotation portion and second link rotation portion.

10. The gravity compensation assembly of claim 9, further comprising:
a pair of link frames including the link frame and spaced apart from each other.

11. The gravity compensation assembly of claim 10, wherein each of the pair of link frames is curved inward.

12. The gravity compensation assembly of claim 9, further comprising:
a third link rotation portion rotatably connected to the weight body based on a rotation axis in a y-axis direction and being on the one side of the link frame, and
a fourth link rotation portion rotatably connected to the auxiliary frame assembly based on the rotation axis in the y-axis direction and being on the other side of the link frame.

13. The gravity compensation assembly of claim 9, wherein the auxiliary frame assembly comprises:
a fixed frame to which the second link rotation portion of the link frame is rotatably connected; and
a roll rotation portion connected to the inner rotation portion and configured to rotate based on a rotation axis in a y-axis direction from one side of the fixed frame.

14. The gravity compensation assembly of claim 13, wherein the auxiliary rotation portion is configured to rotate based on the rotation axis in the y-axis direction from the other side of the fixed frame.

15. The gravity compensation assembly of claim 14, wherein
the main frame assembly comprises an auxiliary roll rotation portion configured to rotate the outer rotation portion based on the rotation axis in the y-axis direction, and
the auxiliary roll rotation portion is configured to rotate in connection with rotation of the roll rotation portion and rotation of the auxiliary rotation portion.

16. The gravity compensation assembly of claim 1, wherein
the inner rotation portion and the auxiliary rotation portion each include a universal joint, and
the outer rotation portion includes a ball joint.

17. The gravity compensation assembly of claim 1, wherein the main frame assembly comprises a main frame that is a center support structure.

18. The gravity compensation assembly of claim 17, wherein the main frame assembly further comprises:
an auxiliary roll rotation portion configured to rotate the outer rotation portion based on a rotation axis in a y-axis direction; and
a connecting portion connecting the main frame and the auxiliary roll rotation portion to each other.

19. A waist structure of a robot, comprising the gravity compensation assembly of claim 1.

* * * * *